June 21, 1932.                H. T. PORTER                1,863,728
                      SURGE TANK FOR WATER PIPE LINES
                      Filed April 13, 1929      2 Sheets-Sheet 1
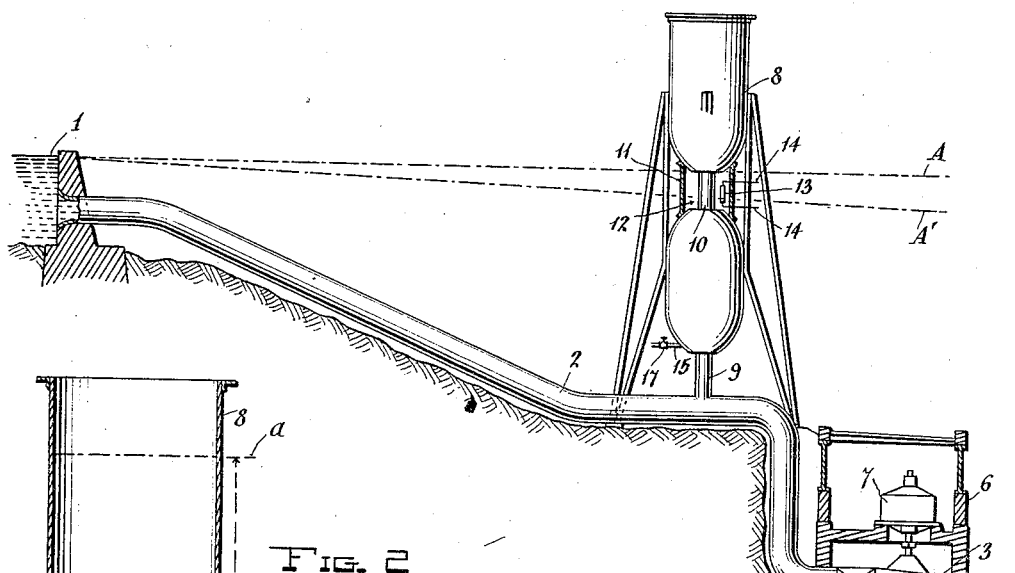
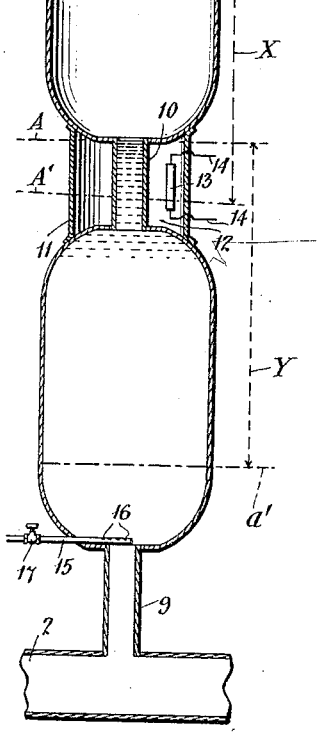
INVENTOR
Harry T. Porter,
BY
ATTORNEY

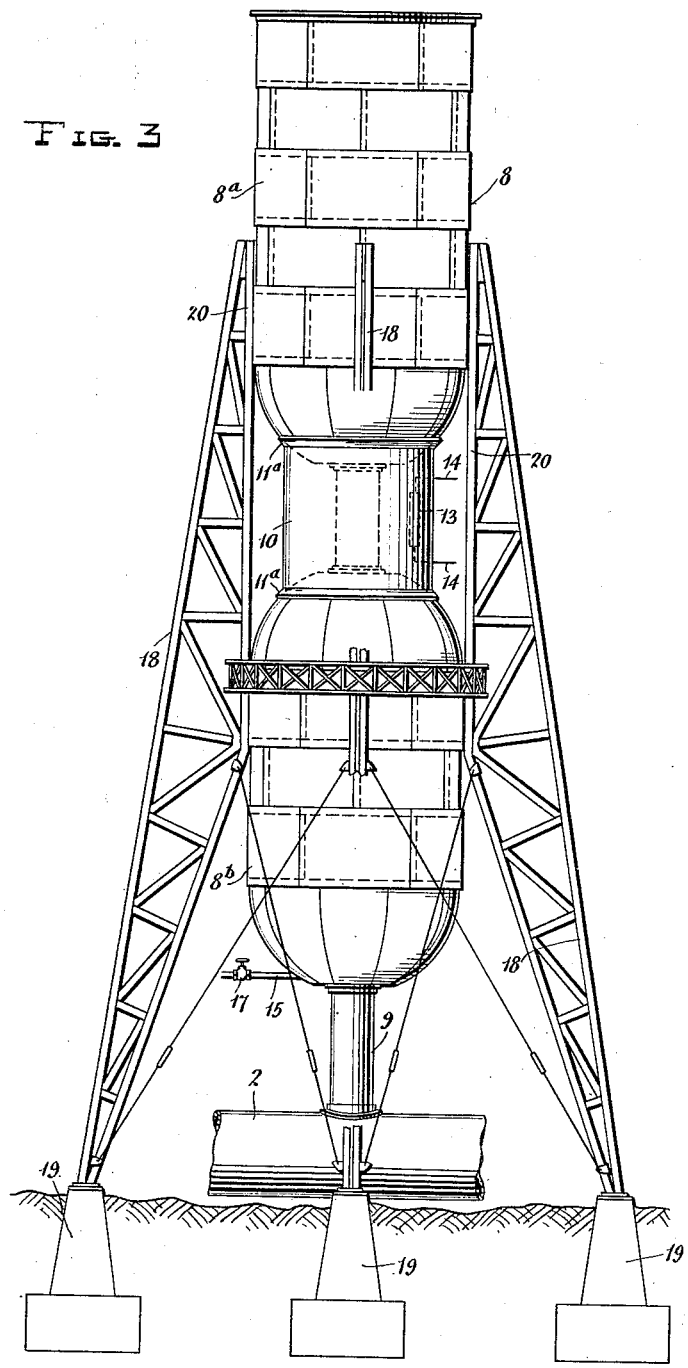

Patented June 21, 1932

1,863,728

UNITED STATES PATENT OFFICE

HARRY T. PORTER, OF RIVERSIDE, ILLINOIS, ASSIGNOR TO S. MORGAN SMITH COMPANY, OF YORK, PENNSYLVANIA, A CORPORATION OF PENNSYLVANIA

SURGE TANK FOR WATER PIPE LINES

Application filed April 13, 1929. Serial No. 354,953.

The present invention relates to improvements in surge tanks for hydraulic systems of various kinds employing a relatively long pipe line wherein the rate of flow of water or other liquid fluctuates rapidly and it is desirable or necessary to preserve a substantially uniform pressure of the liquid in the pipe. The invention is more particularly adapted for use in connection with hydraulic turbine installations wherein the water to operate the turbine is usually supplied thereto through a relatively long pipe line or penstock, the surge tank serving to prevent excessive pressure rise in the pipe line when the load is rejected by the turbine, which causes a reduction in the quantity of water flowing to the turbine, and to prevent excessive pressure drop in the pipe line when an increased load is suddenly imposed on the turbine, which demands a sudden increase in the flow of water to the turbine.

Surge tanks have been heretofore employed for such purpose, but experience has shown that where such surge tanks have been used in cold climates they frequently presented difficulties due to freezing of the surface of the water in the tank, such freezing rendering the surge tank inoperative and useless.

The primary object of the present invention is to provide a novel and improved surge tank of this general class which is capable of maintaining a substantially constant flow of water or liquid and of minimizing pressure fluctuations in the pipe line or the like to which it is connected.

Another object is to provide a surge tank the construction of which is such that freezing of the surface of the water therein in cold weather is avoided.

A further object is to provide a surge tank which can be kept from freezing in cold weather, especially where the fluctuations in pressure in the pipe line are small or substantially imperceptible, by applying a minimum amount of heat.

To these and other ends, the invention consists in certain improvements and combinations and arrangements of parts all as will be hereinafter more fully described, the features of novelty being pointed out particularly in the claims at the end of the specification.

In the accompanying drawings:—

Figure 1 is a diagrammatic view of a hydro-electric plant provided with a surge tank embodying the present invention;

Figure 2 is a diagrammatic view of the surge tank showing the water level therein under different existing conditions, and Figure 3 is an elevation of the preferred form of the surge tank, illustrating the detail construction thereof.

Similar parts are designated by the same reference characters in the different views.

While the invention is applicable generally to hydraulic systems of various kinds wherein it is desirable or necessary to preserve a substantially uniform pressure of water or liquid in a conducting pipe, notwithstanding rapid fluctuations in its rate of flow, the invention is shown in the present instance as applied to a hydraulic turbine installation wherein constant speed of the runner is desirable or necessary, especially when the turbine is employed to drive an electric generator. The construction of the surge tank and the manner of using it as shown in the present instance is generally preferred, but it is to be understood that equivalent constructions and arrangements may be used and such will be included within the scope of the claims.

In the hydraulic plant shown in the present instance, 1 represents a forebay for supplying water to the plant, 2 represents a pipe line or penstock which receives water from the forebay and conveys it to a hydraulic turbine 3 which is at a lower elevation than the forebay and often at a considerable distance therefrom, the turbine discharging the water after passing therethrough and actuating its runner, into a draft tube 4 from which the discharged water flows into a tail race or other outlet 5. The turbine as shown is arranged in a powerhouse 6 and its runner is connected to an electric generator 7 which serves to convert the power developed by the turbine into electrical power. 8 represents the surge tank which is usually located as closely as practicable to the turbine and is maintained in communication at its lower end with the penstock by a pipe or conduit 9.

In the operation of a hydro-electric unit, it is necessary to vary the supply of water to the hydraulic turbine runner, by adjustment of the wicket gates or guide vanes thereof, with comparative rapidity in order to maintain practically constant speed of the electric generator notwithstanding changes in the load thereon. In plants where the pipe line or penstock is long, such rapid variations in the supply of water to the turbine cause momentary but relatively large variations in pressure of the water in the pipe line, the pressure rising when the load is rejected and the supply of water to the turbine decreased and the pressure dropping when an increased load is demanded and the supply of water to the turbine is increased, the pressure change in the pipe line being a function of the length of the pipe line, the velocity of the water in the pipe line, and the time rate of change of the gate opening controlling the supply of water to the turbine runner. By placing a surge tank comparatively close to the hydro-electric unit the effect is to decrease the length of the pipe line to the distance between the surge tank and the turbine, insofar as actual and calculated pressure changes are concerned.

Heretofore, surge tanks have been used which were of constant or uniform diameter from top to bottom and the head water level would, in general, lie at about the center of the height of the tank, but since the cross sectional area of the surge tank, in order to perform its intended function, is several times the cross sectional area of the pipe line, a ratio as high as approximately 10 to 1 is often used, it will be evident that in using surge tanks as heretofore employed, the area of the surface of the water in the tank is very large and when the load on the turbine is steady the surface of the water in the tank is quiet, and in cold climates much difficulty has been experienced with such surge tanks due to severe freezing of the surface of the water therein. Obviously, if the surface of the water becomes frozen, it cannot surge upwardly because of the wall of ice formed on it and frozen to the sides of the tank, and the water cannot surge downwardly because a downward surge would require the creation of a vacuum beneath the covering of the ice and such vacuum would resist a downward surge. Owing to the relatively large diameter of the surge tanks as previously used, prevention of freezing of the surface water therein by applying heat was very difficult and expensive and frequently impossible of accomplishment.

The present invention provides a novel and improved surge tank which is capable of operating efficiently to prevent excessive pressure rise in the pipe line when the load on the turbine is rejected and to prevent an excessive pressure drop when the load on the turbine is suddenly increased, and which is capable of overcoming the difficulties heretofore experienced due to freezing of the surface water in the tank. According to the present invention, a small diameter connection is provided between the surge tank and the pipe line to dampen the surges set up in a long pipe line, when the demand for water is suddenly changed. In the construction shown in the present instance, the pipe or conduit 9 which connects the bottom of the surge tank with the pipe line 2 has a diameter which is only a small fraction of the diameter of the tank and it may also be smaller in diameter than that of the pipe line. The differential diameters of the connection 9 and of the pipe line and surge tank enables part of the water flowing in the pipe line toward the turbine to be diverted through the connection 9 into the surge tank when the load on the turbine is reduced, the diversion of this water from the pipe line into the surge tank avoiding an excessive rise in pressure of the water in the pipe line due to the sudden reduction in the volume of water demanded by the turbine, the relatively small diameter of the connection 9 with respect to the diameters of the pipe line and the surge tank effecting dampening of the surge in the pipe line and diminishing the extent of rise of the water in the surge tank, and when the turbine demands an increased supply of water from the pipe line, as when the load on the turbine is increased, such suddenly increased demand is supplied not only from the pipe line but also from the surge tank, the sudden drop in pressure of the water in the pipe line causing water to flow into it from the surge tank, and the supply of water from the pipe line, augmented by the water flowing from the surge tank will prevent an excessive drop in pressure of the water in the pipe line, with the result that substantially constant speed of the turbine will be maintained notwithstanding sudden increases and decreases in the demands of the turbine, due to variations in the load thereon. It is to be understood that hydraulic turbines are commonly equipped with automatic governors for increasing or diminishing the gate openings controlling the flow of water to the turbine runner, these governors acting quickly in response to speed variations of the runner to maintain substantially constant speed thereof.

Also, according to the present invention, that part of the surge tank in which the head water level stands is provided with a constriction in its cross sectional area so that relatively small pressure waves in the pipe line will cause relatively large changes in the level of the surface of the water in that part of the tank and the agitation or movement of the water level thus produced will overcome the tendency of the surface of the water to freeze. The reduction in the cross sectional area of the surge tank in the region where the head water level stands may be accomplished in different ways, but it is generally preferable to accomplish it in the manner shown in the present instance wherein the middle of the tank or the part thereof intermediate its upper and lower ends is formed by a tubular portion 10 which is much smaller in diameter than the diameter of the portions of the tank above and below it, this tubular portion of the tank thus forming a constriction in its diameter and cross sectional area. In installing a surge tank so constructed, it is mounted so that its constricted portion lies substantially between the standing head water level indicated by the line A which corresponds with the level of the water in the surge tank when the turbine unit is not running, and the level indicated by the line A' which conforms with the level of the surface of the water in the surge tank when the turbine unit is running and taking its maximum supply, the line A' taking into consideration the pressure drop due to friction in the pipe line and other losses in head. The line $a$ (Fig. 2) indicates the highest level reached by the water in the surge tank due to load rejection and the line $a'$ indicates the lowest level of the water in the tank caused by a maximum surge due to a load demand, the range of maximum surge due to load rejection being represented by the line X and the range of maximum surge due to load demand being represented by the line Y.

In the operation of a turbine unit, the load thereon is not entirely steady and hence there are changes of a few percent in the demand taking place almost continuously. There will, therefore, be very small pressure waves in the pipe line almost continuously, and this condition will cause a slight change in the head water level in the constricted part of the surge tank, and this continuous motion or agitation of the water will prevent freezing thereof, since the surface of the water during the usual operation of the turbine will lie within the constriction in the tank and the reduction in the cross sectional area of the surge tank, produced by the constriction, will cause relatively small pressure waves with the pipe line to bring about rising and falling movements of the surface of the water, of considerable magnitude. To effect this result, it is generally preferable to proportion the cross sectional area or diameter of the constriction 10 so that it is substantially equal to that of the pipe 9 which connects the surge tank with the pipe line, and as previously stated, the cross sectional area or diameter of the connection 9 is preferably less than that of the pipe line.

In plants where the load is absolutely steady, as sometimes exists where the plant is part of a large system, the surface of the water within the constriction of the tank will be motionless, or substantially so, and in cold climates it might be necessary to supply heat to prevent freezing of the surface of the water by keeping the temperature of the water above the freezing point. By constructing the tank with the constriction in its diameter or cross sectional area, the volume of water which must be thus heated to prevent freezing is relatively small so that the heating can be accomplished with facility and by applying a relatively small amount of heat. Where, as in the present instance, the constriction in the tank is formed by a tubular portion of reduced diameter, such as the tubular portion 10, this constricted portion of the tank may be easily and inexpensively enclosed by a housing 11, the housing being preferably heat insulated and forming a chamber 12 which surrounds the constriction and serves to minimize the expenditure of heat, and a suitable heating device may be placed within this chamber to supply the amount of heat required to prevent freezing of the water in the constriction. In the present instance, an electric heater 13 is shown arranged within the chamber 12 and it may be connected by the wires 14 to any source of electrical current supply, the electric current developed by the hydro-electric unit being convenient and suitable for the purpose.

Instead of applying heat to the constricted portion of the tank, or in addition to such heat applying means, means may be provided for introducing compressed air or other suitable gas into the tank to agitate the water therein sufficiently to prevent freezing of the water at its surface. As shown in the present instance, a compressed air supply pipe 15 is provided which may receive compressed air from any suitable source, as from the powerhouse, and this compressed air supply pipe leads into the tank preferably at a level within or just above the upper end of the pipe 9 and the portion of this compressed air supply pipe within the tank is provided with orifices 16 through which the compressed air is discharged into the water below the surface thereof, the consequent disturbance or agitation of the water, due to the rising of the air bubbles therein, preventing freezing of the water at or near its surface. The pipe 15 may be provided with a valve 17 to control the supply of compressed air as needed. In using compressed air to prevent freezing of the water in the tank, the bubbles formed by the air introduced into the water will act to circulate the water, as such bubbles rise, and this circulation of the water will assist in preventing freezing of the water at its surface, especially when the compressed air is admitted near the bottom of the tank where the bubbles formed by the air thus introduced will bring up some of the warmer water at the bottom of the tank to the surface of the water in the constricted area of the tank. The compressed air may be piped from any suitable source, compressed air under pressure being usually available in hydro-electric plants.

Figure 3 illustrates the preferred construction of the surge tank, its upper and lower portions 8$^a$ and 8$^b$ being composed preferably of plate steel riveted together in sections, the upper end of the upper section 8$^a$ being open to the atmosphere and the lower end of this section and the upper and lower ends of the lower section 8$^b$ being preferably rounded or approximately hemi-spherical. The housing 11 which encloses the constriction 10 may be composed of a cylindrical member which encircles the tubular constriction 10 concentrically and is secured at its upper and lower ends to the hemi-spherical adjacent ends of the upper and lower tank sections, securing flanges 11$^a$ being preferably employed. The weight of the tank is sustained by a suitable framework, this framework comprising preferably a suitable number of uprights 18, preferably of lattice construction for strength and rigidity, the lower ends of these frames resting on foundation piers 19 of concrete or the like, which may be embedded in the ground, and the upper portions of the frames span the upper and lower tank sections 8$^a$ and 8$^b$ and they have parallel inner members 20 which are secured to the sides of the upper and lower tank sections, the frame members thus receiving the weight of the entire tank and supporting it, thus relieving the pipe connection 9 from the weight of the tank, and the frame members furthermore support the tank sections rigidly in fixed relation and as a unit.

While the invention has been shown and described as applied to a hydraulic turbine installation, it is to be understood that the invention may also be applied to hydraulic systems of various other kinds wherein it is desirable or necessary to prevent excessive rise or drop in pressure or to maintain a substantially uniform rate of flow of the liquid in a pipe line or conduit, as for example where the pipe line is supplied with liquid from a pump which tends to produce surges or pulsations of the liquid in the pipe line, or where the quantity of water demanded from a pipe line fluctuates rapidly.

I claim as my invention:—

1. A surge tank for the pipe line of a hydraulic system comprising a lower section connected to the pipe line, an upper section arranged in spaced relation above the lower section, and an intermediate section connecting the lower and upper sections, said intermediate section terminating at the top of the lower section and at the bottom of the upper section and having a diameter less than the diameter of said lower and upper sections so as to provide a restricted communication between said lower and upper sections, the tank being so located that water is normally contained in the lower and intermediate sections with the upper level of the water in the intermediate section so that a small volume of water is provided at the upper level, a casing enclosing said intermediate section, and a heating element disposed within the casing for heating the water in said intermediate section to prevent freezing of the water in cold weather.

2. A surge tank for the pipe line of a hydraulic system comprising a lower portion connected to the pipe line, an upper portion superposed above said lower portion, and an intermediate portion interposed between the upper and lower portions, said intermediate portion being of smaller cross-sectional area than the upper and lower portions and terminating at the bottom of the upper portion and the top of the lower portion, a casing enclosing said intermediate portion, and a heating element disposed within the casing for heating the water in said intermediate portion.

3. A surge tank for the pipe line of a hydraulic system comprising a lower portion connected to the pipe line, an upper portion superposed above said lower portion, and an intermediate portion interposed between the upper and lower portions, said intermediate portion being of smaller cross-sectional area than the upper and lower portions and terminating at the bottom of the upper portion and at the top of the lower portion.

4. A surge tank for the pipe line of a hydraulic system comprising a lower section connected to the pipe line, an upper section arranged in spaced relation above the lower section, and an intermediate section connecting the lower and upper sections, said intermediate section terminating at the top of the lower section and at the bottom of the upper section and having a diameter less than the diameter of said lower and upper sections so as to provide a restricted communication between said lower and upper sections.

In testimony whereof I have hereunto set my hand.

HARRY T. PORTER.